United States Patent Office 3,840,628
Patented Oct. 8, 1974

3,840,628
MANUFACTURE OF RESILIENT COMPOUND
FOAMS
Fritz Stastny, Ludwigshafen, Hans Georg Trieschmann, Hambach, Rudolf Gaeth, Limburgerhof, and Heinz-Hermann Koerner, Ludwigshafen, Germany, assignors to Badische Anilin- & Soda-Fabrik Aktiengesellschaft, Ludwigshafen (Rhine), Germany
Filed June 2, 1972, Ser. No. 259,250
Claims priority, application Germany, June 9, 1971, P 21 28 684.0
Int. Cl. B29d 27/04
U.S. Cl. 264—46                    7 Claims

ABSTRACT OF THE DISCLOSURE

Resilient compound foams are manufactured by foaming a reaction mixture consisting of (A) prefoamed, resilient olefin polymer particles having a smooth surface and bevelled or rounded edges and (B) a foamable mix of polyisocyanates, polyols, water and, optionally, auxiliaries, one component of the foamable mix (B) being coated onto the olefin polymer particles (A), whilst the remaining components of mix (B) are placed in a mold followed by the olefin polymer particles (A) and the mold is turned through approximately 180° to cause the starting materials to contact each other and thus cause the reaction mixture to foam.

---

Figure 1:
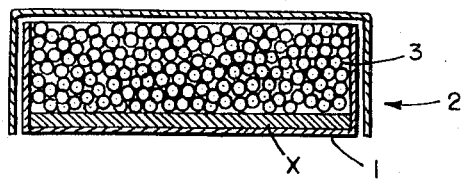
Figure 2:
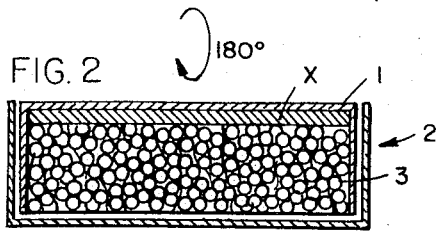
Figure 3:
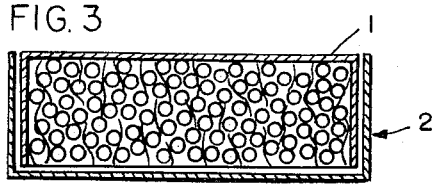

This invention relates to a modified process for the manufacture of resilient compound foams by foaming a reaction mixture of prefoamed resilient olefin polymer particles having a smooth surface and bevelled or rounded edges and a foamable mix of polyisocyanates, polyols, water and, optionally, auxiliaries, in a mold.

It is known that rigid foamed structures of satisfactory dimensional stability may be manufactured by placing discrete particles of a porous styrene polymer and a foamable mix of polyols, diisocyanates or polyisocyanates and auxiliaries, which react to form polyurethanes, in a mold and causing the mixture to foam. The advantage of this method is that the porous styrene polymer particles come under the heading of rigid foams and do not therefore suffer deformation during the formation of the polyurethane foam on account of their high compressive strength. If, however, these rigid styrene polymer particles are replaced by resilient olefin polymer particles having a bulk density of approximately 15 g./l., the latter do not become uniformly embedded in the polyurethane foam, as the resilient olefin polymer particles are deformed under the pressure of the polyurethane foam as it forms and it is thus not possible for the foamable reaction mixture to flow between said particles. If, for example, a foamable mix of polyisocyanates, polyols, water and additives is placed in a mold and covered with a layer of resilient particles of prefoamed material, it is found that the formation of polyurethane takes place in the lower portion of the mold whilst the resilient particles of prefoamed material are pressed together and against the walls of the mold. This prevents uniform distribution of the resilient particles of foam in the polyurethane foam. There is thus obtained a layer of polyurethane foam with loose or weakly adhering resilient prefoamed particules distributed over its surface. Similar products are again obtained when the resilient prefoamed particles are placed in the mold first and the foamable polyisocyanate/polyol/water mix is poured onto them.

It is also known to use comminuted prefoamed polymer particles such as particles of prefoamed polyurethanes, butadiene/styrene latex, polyvinyl acetate or polyvinyl chloride, and isocyanate group-containing prepolymers and to cause reaction of the latter in the presence of water/catalyst mixtures to form polyurethane foams containinng said polymer particles embedded therein. Foamed polymer particles obtained by shredding waste polymers possess irregular surfaces usually of a jagged nature. The particles therefore intermesh readily to form relatively large agglomerate which are difficult to mix uniformly with the isocyanate group-containing prepolymer. The resulting molded foams thus contain the prefoamed polymer particles in extremely irregular distribution so that the allround properties of such products show marked variations. Another drawback is that the isocyanate group-containing prepolymers suitable for this process must first be manufactured in a separate and expensive stage.

It is an object of the present invention to produce resilient compound foams, containing prefoamed soft elastic plastics particles uniformly embedded therein.

We have found that resilient compound foams of this kind may be obtained by foaming, in a mold having a movable lid, a reaction mixture consisting of (A) prefoamed soft elastic particles of olefin polymers having a particle size of from approximately 3 to 50 mm. and
(B) a foamable mix of polyisocyanates, polyols, water, catalyst and optionally other auxiliaries conventionally used in the production of polyurethane foams, provided that one component of the foamable mix (B) is coated onto the prefoamed soft elastic particles (A), which have a smooth surface and bevelled or rounded edges and a bulk density of from 5 to 100 g./l. whilst the remaining components of the foamable mix (B) are placed in the mold and then covered by a layer of the treated, prefoamed soft elastic particles, whereupon the mold is turned through approximately 180° to cause the foamable mix (B) to contact the treated, prefoamed soft elastic particles with the result that a polyurethane foam forms between the prefoamed soft elastic particles (A) so that said particles (A) become embedded in said polyurethane foam.

In our novel process use is made of prefoamed soft elastic particles (A) of olefin polymers, which have a diameter of from about 3 to 50 mm. and preferably from 5 to 20 mm., a smooth surface with bevelled or rounded edges and a bulk density of from 5 to 100 g./l. and preferably from 8 to 60 g./l. and more preferably from 10 to 20 g./l. By olefin polymers we mean homo- and co-polymers of olefins of from 2 to 4 carbon atoms. Particuarly suitable are olefin homopolymers and copolymers whose X-ray crystallinity at 25° C. is more than 25%. Thus for example homopolymers of ethylene, propylene and butylene or copolymers of these monomers are suitable. Particularly suitable for our process are copolymers of ethylene with other ethylenically unsaturated monomers, in which the proportion of polymerized ethylene units is conveniently more than about 50% by weight. As examples there may be mentioned copolymers of ethylene with from 5 to 30% by weight of acrylates, methacrylates or vinyl carboxylates having from 1 to 6 carbon atoms in the alcohol radical, based on the total weight of copolymer. Of the comonomers, n-butyl acrylate, t-butyl acrylate and vinyl acetate are particularly important. Mixtures of olefin polymers with each other or with other polymeric compounds may also be used.

By prefoamed particles of olefin polymers, often referred to as foamed particles, we mean particles of foamed material in which the walls of the cells consist of oylefin polymer. The particles are completely foamed and contain virtually no more foaming agent so that further foaming on heating is no longer possible. In our process, we prefer to use particles having a major proportion of closed cells. The prefoamed particles are obtained by conventional industrial methods, for example by mixing the olefin polymers with a foaming agent in an extruder and extruding the mixtures through a die, foamable extrudate being broken up immediately on leaving the die and prior to foaming. Alternatively, the particles used may be such as have been obtained by heating mixtures of olefin and foaming agent of the kind which forms gaseous products on decomposing.

If higher thermal stability is desired in the prefoamed plastics particles, it is convenient to use foamed particles of olefin polymers, particularly of ethylene homopolymers and ethylene copolymers, which have a gel content of, say, from 10 to 85% and preferably from 30 to 60% by weight. By gel content we mean that proportion by weight of the polymer which is insoluble in solvents at temperatures above the crystalline melting point. In the case of olefin polymers, the gel content is determined, for example, by heating the particles in toluene to temperatures of 100° C. and filtering off and drying the insoluble portions.

Prefoamed plastics particles containing cross-linked portions may be obtained by various methods. One particularly successful procedure involves treatment of the prefoamed closed-cell particles with high-energy radiation. For example, X-rays or electron beams may be caused to act on the particles. In one particularly suitable method of producing these particles, the particulate, prefoamed olefin polymers are treated with electron beams at a dose of from approximately 5 to 60 megarads. The manufacture of these particles has been described for example in French Pat. 1,532,988.

The production of polyurethane foams from polyols, water and polyisocyanates, which are used in the present invention in conjunction with said prefoamed soft elastic particles of olefin polymers, is well described in the literature. From the large number of starting materials used commercially in the production of polyurethane foams it is convenient to select those which normally lead to the formation of flexible foams.

The polyols used are polyetherols and/or polyesterols, which may be linear and/or partially branched and which have molecular weights ranging from 300 to 10,000 and in particular from 900 to 5,000 and preferably from 1,800 to 3,000. As examples there may be mentioned polyetherols obtained by polyalkoxylation of dihydric or polyhydric alcohols and preferably dihydric and/or trihydric alcohols, such as ethylene glycol, propylene glycol, butanediol-1,3, butanediol-1,4, trimethylolpropane and glycerol, with ethylene oxide and/or propylene oxide. Mixtures of different hydroxy-containing polyalkylene oxides, for example those produced from mixtures of alcohols by the addition of ethylene oxide and/or propylene oxide, may also be used. The polyetherols possess OH numbers of from 30 to 100 and preferably from 40 to 60.

Suitable polyesterols, which have OH numbers of from 40 to 70 and preferably from 50 to 65, are usually condensed from aliphatic and/or aromatic dicarboxylic acids, for example phthalic acid and terephthalic acid and preferably succinic acid, glutaric acid, adipic acid, pimelic acid and sebacic acid, and dihydric and/or trihydric alcohols, for example glycol, ethylene glycol, butanediol - 1,4, butanediol-1,3, hexanediol-1,6, trimethylol propane and glycerol, at elevated temperatures and, if necessary, in the presence of catalysts such as titanium salts of alcoholates. Particularly suitable are polyesterols having an acid number of less than 25.

As examples of suitable polyisocyanates there may be mentioned aliphatic diisocyanates such as hexamethylene diisocyanates, 2,2,4- and 2,4,4-trimethylhexamethylene diisocyanates, 2,2'-, 2,4'- and 4,4'-dicyclohexylmethane diisocyanates; aromatic diisocyanates such as 1,3- and 1,4-phenylene diisocyanates, 1,5-napthalene diisocyanate, 3,3'- and 4,4'-diphenyl diisocyanates and, preferably, 2,4- and/or 2,6-toluylene diisocyanates and 2,2'- and 2,4'- and/or 4,4'-diphenylmethane diisocyanates; and polyfunctional isocyanates such as 2,4,6-toluylene triisocyanate and polyphenylpolymethylene polyisocyanates. Preferred polyisocyanates are the commercially available aromatic toluylene and diphenylmethane diisocyanates. These products may be used singly or in the form of mixtures.

The polyols, water and polyisocyanates are mixed in such proportions that there are 0.9 to 1.1 and preferably from 1.01 to 1.05 equivalents of isocyanate groups in the polyisocyanates per equivalent of hydroxy groups in the polyols or per mole of water.

The foaming effect is usually achieved by using, as foaming agent, the carbon dioxide liberated in the reaction of isocyanates with water. If desired, volatile substances may be added to the foamable mix, which substances evaporate during foaming to increase the foaming effect. Examples of such substances are halo-substituted alkanes such as trichlorofluoromethane, dichlorodifluoromethane, acetone, ethyl acetate and lower organic hydroxyl compounds such as methanol, ethanol or the glycols.

In order to accelerate the reaction between the hydroxyl group-containing compounds, such as polyols and water, and the polyisocyanates, conventional catalysts such as tertiary amines, e.g. triethylamine, pyridine, N-methyl morpholine and, preferably, triethylene diamine, and metal salts such as iron(II) chloride, zinc chloride and, preferably, tin(II) salts and dibutyltin dilaurate, are added to the foamable mixes. Particularly suitable are catalyst systems comprising tertiary amines and tin salts.

To the mixtures of prefoamed soft elastic particles of olefin polymers, polyisocyanates, polyols, water and catalyst there may also be added, if desired, other additives such as stabilizers, plasticizers, fungicides, bactericides, flame retardants, dyes and fillers.

The relative proportions of the prefoamed soft elastic particles of olefin polymers (A) and the foamable mix (B) of polyisocyanates, polyols, water and catalyst may be varied within wide limits. In general, from 20 to 100 g. and preferably from 30 to 50 g. of foamable mix (B) are used per liter of prefoamed plastics particles (A). This produces resilient compound foams containing embedded particles of olefin polymers in a volume of from 200 to 800 ml. and preferably from 400 to 600 ml. per liter of foam. Resilient compound foams of this kind have densities of from 25 to 100 g./l. and preferably from 30 to 60 g./l.

Specifically, the resilient compound foams are manufactured as follows: An appropriate amount of one component of the foamable mix (B) is coated onto the prefoamed soft elastic particles of olefin polymers having a smooth surface and rounded or bevelled edges (A) and the thus coated particles are then charged into a mold. The preferred component of the foamable mix (B) used in this manner is water. Alternatively, the polyisocyanate or the polyol may be evenly coated onto the prefoamed plastics particles (A).

The remaining components of the foamable mixture (B), for example polyol, water and catalyst or, preferably, polyisocyanate, polyol and catalyst, are mixed thoroughly and contacted with the coated prefoamed particles (A) in the mold. This may be effected, for example, by distributing the mixture of the remaining components of the foamable mix (B) by causing it to flow down between the coated prefoamed particles (A). Alternatively, the individual components may be contacted with each other by rotating or centrifuging the mold.

FIGS. 1 to 4 are schematic cross-sectional representations of four stages of the subject process.

Figure 4:
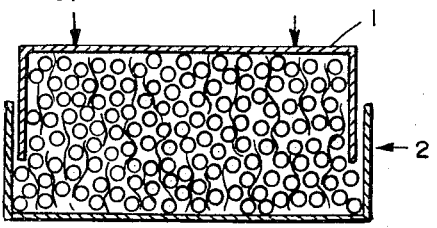

Our process for the manufacture of resilient compound foams is preferably carried out by coating the prefoamed soft elastic plastics particles with water, thoroughly mixing the remaining components of the foamable mix (B), i.e. polyisocyanate, polyol, catalyst and any additives, placing said mixture 1 in a mold 2 and covering it with a layer 3 of the wetted prefoamed elastic plastics particles (A) (FIG. 1). By turning the mold through about 180°, the remaining components of the foamable mix (B) are brought into contact with the water-wet prefoamed plastics particles (A) (FIGS. 2 and 3) so that a polyurethane foam is formed between the prefoamed plastics particles (A), which particles (A) thus become embedded in the polyurethane foam. In this way, resilient compound foams are produced in which the prefoamed plastics particles are uniformly distributed throughout the polyurethane foam (FIG. 4).

The manufacture of the resilient compound foams is carried out in molds. We prefer to use molds which have at least one movable wall, preferably a movable lid. It is convenient to use a movable lid or hood of which the side portions overlap the sidewalls of the mold, which are fixed to the baseplate, the distance of said side portions from the side walls of the mold being smaller than the diameter of the prefoamed soft elastic plastics particles. This enables the volume of the mold to be approximately doubled as the foamable mix foams. The use of such a mold is particularly advantageous when it is desired to increase the volume to a definite extent in order to obtain a specific density of the resilient compound foam when cured.

When carrying out the process on a commercial scale it is convenient to use molds having walls to which the resilient compound foams will not adhere, for example molds coated on the inside with polytetrafluoroethylene. Alternatively, the molds may be lined with a thin material such as smooth paper or smooth plastics sheeting so as to prevent sticking of the molding to the walls of the mold.

The resilient compound foams produced by the process of the invention contain prefoamed plastics particles uniformly embedded throughout the polyurethane foam. Due to this uniform structure, the molded foams show constant properties over their entire volume. The products possess high resistance to compression, good shock absorbing properties, good elastic recovery, excellent energy, heat and sound absorbing properties and low water vapor permeability.

The resilient compound foams have a variety of applications. The products are suitable, for example, for use as upholstery, linings, heat and sound insulating panels for use in buildings, insulating material, for example in vehicle bodies, for the production of intermediate layers in composite assemblies and as spring elements for making vibrating screens.

In the following Examples the parts are by weight.

EXAMPLE 1

A mold made of 1 mm. thick aluminum sheet and having the dimensions 632 x 632 x 125 mm. (capacity 50,000 cu. cm.) and having a movable lid with the dimensions 635 x 635 x 125 mm. is taken, and the following homogeneous mixture is poured into it:

1,490 g. of a polypropylene glycol ether having a molecular weight of approximately 2,500 and an OH number of approx. 55,
680 g. of an 80:20 w./w. mixture of 2,4- and 2,6-toluylene diisocyanate,
3.5 g. of triethylene diamine,
3.5 g. of tin dioctoate,
2.5 g. of polyether siloxane (sold as Stabilizer OS 20 by Farbenfabriken Bayer, Leverkusen) and
14.5 g. of silicone compound (sold as Additive Si by Farbenfabriken Bayer, Leverkusen).

This mixture is then covered with a layer consisting of 640 g. of prefoamed polyethylene particles having a diameter of approximately 18 mm. and a bulk density of 20 g./l., which particles have been previously uniformly wetted with a mixture of 113 g. of water and 5 g. of ethanol. The movable lid is placed in position on the mold which is then inverted by rotating it through 180° in from 1 to 5 seconds. This causes the wetted plastics particles to be contacted by the remaining components of the foamable mix. During a period of approximately 1 to 10 minutes the mixture foams, thereby causing the upper portion of the mold to be raised by about 70 mm. The density of the foam may be varied, if desired, by applying a counterpressure. The foamed molding containing the prefoamed polyethylene particles uniformly embedded therein is removed from the mold after 45 to 60 minutes.

The molding shows a low degree of water vapor permeability and exhibits, despite its high resistance to compression, good resilience, i.e. good recovery after compression.

The resilient compound foam is particularly suitable for use in the manufacture of upholstery, linings and sound and heat insulating materials for buildings and machinery.

COMPARATIVE EXAMPLES

A. If a polyurethane foam is produced in a similar manner to that described in Example 1 but without the addition of prefoamed polyolefin particles, there is obtained a foam showing lower energy absorption and good water vapor permeability.

B. If Example 1 is repeated but using, in place of a polyol/polyisocyanate mix, a corresponding polyurethane prepolymer having terminal isocyanate groups, there is obtained a resilient compound molding having a density of 64 g./l. and containing the prefoamed polyolefin particles uniformly embedded therein, but this molding cannot be removed from the mold until more than 60 minutes have elapsed.

C. A homogeneous mixture of 351 g. of an isocyanate-containing prepolymer of a linear polyester with an excess of an 80:20 w./w. mixture of 2,4- and 2,6-toluylene diisocyanate,
676 g. of a polyetherol of trimethylol propane, propylene oxide and ethylene oxide having an OH number of about 35,
6.8 g. of triethanolamine,
6.8 g. of dimethylcyclohexylamine and
67.5 g. of monofluorotrichloromethane is stirred with 270 g. of prefoamed polyethylene particles which have been wetted with 60 g. of water, and the whole is placed in a mold of the kind described in Example 1. When foaming of the reaction mixture is complete, there is obtained a molded article having a density of 74 g./l. and containing the prefoamed polyethylene particles in irregular distribution, the major portion of the prefoamed polyethylene particles being embedded in the upper part of the molding.

D. A monogeneous mixture of 1,490 g. of a polypropylene glycol ether having a molecular weight of approx. 2,500 and an OH number of approx. 55,
680 g. of an 80:20 w./w. mixture of 2,4- and 2,6-toluylene diisocyanate,
3.5 g. of triethylene amine,
3.5 g. of tin dioctoate,
2.5 g. of polyether siloxane (Stabilizer OS 20 sold by Farbenfabriken Bayer) and
14.5 g. of a silicone compound (Additive Si sold by Farbenfabriken Bayer)

is thoroughly stirred with 640 g. of prefoamed polyethylene particles having a diameter of approx. 18 mm. and a bulk density of 20 g./l., which have been uniformly wetted with 113 g. of water and 5 g. of ethanol, and the whole is placed in a mold of the kind described in Example 1. When foaming of the reaction mixture is complete, there is obtained a molding having a density of 46.9 g./l. and containing the prefoamed polyethylene particles in irregular distribution, the lower portion of the molding containing no prefoamed polyethylene particles, whilst in the upper half of the molding the polyethylene particles are merely stuck together.

EXAMPLE 2

A mold made of 1 mm. thick aluminum sheet and having the dimensions 200 x 100 x 110.25 mm. and equipped with a movable lid having the dimensions 201 x 101 x 80 mm. and made of 2 mm. thick aluminum sheet, both the mold and the lid being lined with a thin layer of polyethylene sheeting, is taken and the following homogeneous mixture is placed therein:

1,000 g. of a polyesterol of adipic acid and diethylene glycol having a molecular weight of about 2,000 and an OH number of approx. 40,
293 g. of an 80:20 w./w. mixture of 2,4- and 2,6-toluylene diisocyanate,
1.0 g. of triethylene diamine,
1.0 g. of tin dioctoate,
1.0 g. of a stabilizer based on polyether siloxane (Stabilizer OS 20 sold by Farbenfabriken Bayer) and
10.0 g. of a foam stabilizer based on a water-soluble silicone compound (Additive Si sold by Farbenfabriken Bayer).

This mixture is then covered with a layer consisting of 600 g. of prefoamed particles of a mixture of chlorinated polyethylene having a chlorine content of 25% by weight and a molecular weight of about 150,000 and high-pressure polyethylene (1:1 by weight), which particles have a diameter of approx. 16 mm. and a bulk density of 16 g./l. and have been uniformly wetted with a mixture of 150 g. of water and 20 g. of butanol. The movable lid is placed on the mold, which is then inverted by rotation through 180° C.

The molding is removed from the mold after 60 minutes. There is obtained a resilient compound foam having a bulk density of 45 g./l. and containing the prefoamed particles embedded in uniform distribution therein.

EXAMPLE 3

A steel mold having a bottom portion with the dimensions 2,000 x 1,000 x 275 mm. and a movable lid having the dimensions 2,001 x 1,001 x 250 mm., the inside surfaces of both portions being coated with a layer of polytetrafluoroethylene, is taken and a homogeneous mixture of the following composition is poured into it:

6,700 g. of a polypropylene glycol ether having a molecular weight of approx. 3,500 and an OH number of approx. 48,
3,430 g. of an 80:20 w./w. mixture of 2,4- and 2,6-toluylene diisocyanate,
14 g. of triethylene diamine,
14 g. of tin(II) dioctoate,
7 g. of polyether siloxane (Stabilizer OS 20 sold by Farbenfabriken Bayer),
70 g. of a water-soluble silicone compound (Additive Si sold by Farbenfabriken Bayer) and
35 g. of monofluorotrichloromethane.

This mixture is covered with a layer consisting of 3,600 g. of prefoamed copolymer particles containing 89% by weight of polymerized ethylene units and 11% by weight of polymerized vinyl acetate units and which have been wetted with a mixture of 2,000 g. of water and 100 g. of glycerol. The prefoamed copolymer particles, after irradiation in an electron accelerator at a dosage of 20 megarads, have a gel content of 62% and a melt index of 3.5. The particle diameter is approximately 15 mm. and the bulk density is 12 g./l.

The mold is closed with the movable lid and turned over through 180° C. in a few seconds by mechanical means. Within 10 minutes, the top portion of the mold has risen by 70 mm. due to the pressure of the polyurethane foam formed. The molding is removed from the mold after 60 minutes. There is obtained a resilient compound foam having a density of 38 g./l. and containing the prefoamed copolymer particles uniformly embedded therein.

The molding, which shows a high degree of softness and elasticity, good recovery properties, high resistance to compression and good insulating and sound absorbing properties, is highly suitable for use as upholstery material in a variety of applications.

We claim:
1. In a process for the manufacture of resilient compound foams wherein a reaction mixture of
  (A) prefoamed soft elastic olefin polymer particles having a particle size of from about 3 to 50 mm. and
  (B) 20 to 100 g., per liter of said prefoamed plastics particles, of a foamable mix of polyisocyanates, polyols, water, catalyst and, optionally,
  (C) other auxiliaries selected from the group consisting of stabilizers, plasticizers, fungicides, bactericides, flame retardants, dyes and fillers is foamed in a mold having a movable lid, the improvement which comprises:
    (1) coating water onto said prefoamed soft elastic olefin polymer particles, said particles having a smooth surface and bevelled or rounded edges and further having a bulk density of from 5 to 100 g./l.;
    (2) placing the remaining components of said foamable mix in said mold;
    (3) covering said remaining components of said foamable mix in the mold with a layer of said prefoamed soft elastic olefin polymer particles coated with water;
    (4) closing the mold;
    (5) causing said coated prefoamed soft elastic olefin polymer particles to contact said remaining components of said foamable mix by turning said mold; and
    (6) allowing the reaction mixture to foam whereby a polyurethane foam is formed in which from 200 to 800 ml. of the prefoamed soft elastic olefin polymer particles per liter of foam are embedded in said foam.

2. A process for the manufacture of resilient compound foams as set forth in claim 1, wherein the prefoamed soft elastic olefin polymer particles have a gel content of from 10 to 85% by weight.

3. A process as set forth in claim 1, wherein said mold is turned through about 180°.

4. A process as set forth in claim 3, wherein from 400 to 800 ml. of said particles per liter of foam are embedded in said foam.

5. A process as set forth in claim 4, wherein the said foam has a density of from 25 to 100 g./l.

6. A process as set forth in claim 4, wherein said foam has a density of from 30 to 60 g./l.

7. A process as set forth in claim 5, wherein a minor amount of an alcohol is added to the water with which said particles are coated.

(References on following page)

References Cited

UNITED STATES PATENTS

| | | | |
|---|---|---|---|
| 2,958,905 | 11/1960 | Newberg et al. | 264—Dig. 7 |
| 2,975,488 | 3/1961 | Brauner | 264—45 |
| 3,607,797 | 9/1971 | Rubens et al. | 260—2.5 B X |
| 3,608,031 | 9/1971 | Stastny et al. | 260—2.5 B X |
| 3,618,442 | 11/1971 | Kawakami | 260—2.5 B X |
| 3,340,335 | 9/1967 | Winchcombe | 264—54 X |
| 3,686,047 | 8/1972 | Miller | 264—54 X |
| 3,291,873 | 12/1966 | Eakin | 264—54 |
| 3,354,099 | 11/1967 | Stegeman | 264—54 X |
| 3,661,620 | 5/1972 | Dekking et al. | 260—2.5 B X |
| 3,662,043 | 5/1972 | Rubens | 264—54 X |

FOREIGN PATENTS

| | | | |
|---|---|---|---|
| 889,278 | 2/1962 | Great Britain | 264—Dig. 7 |

PHILIP E. ANDERSON, Primary Examiner

U.S. Cl. X.R.

161—159, 190; 260—2.5 B, 2.5 AA; 264—53, 54, Dig. 5, 310